Feb. 20, 1962 F. A. COOLEY 3,022,108
POWER-ACTUATED TAIL GATE
Filed June 17, 1960 3 Sheets-Sheet 1

INVENTOR.
Floyd A. Cooley
BY
R. P. Barnard
ATTORNEY

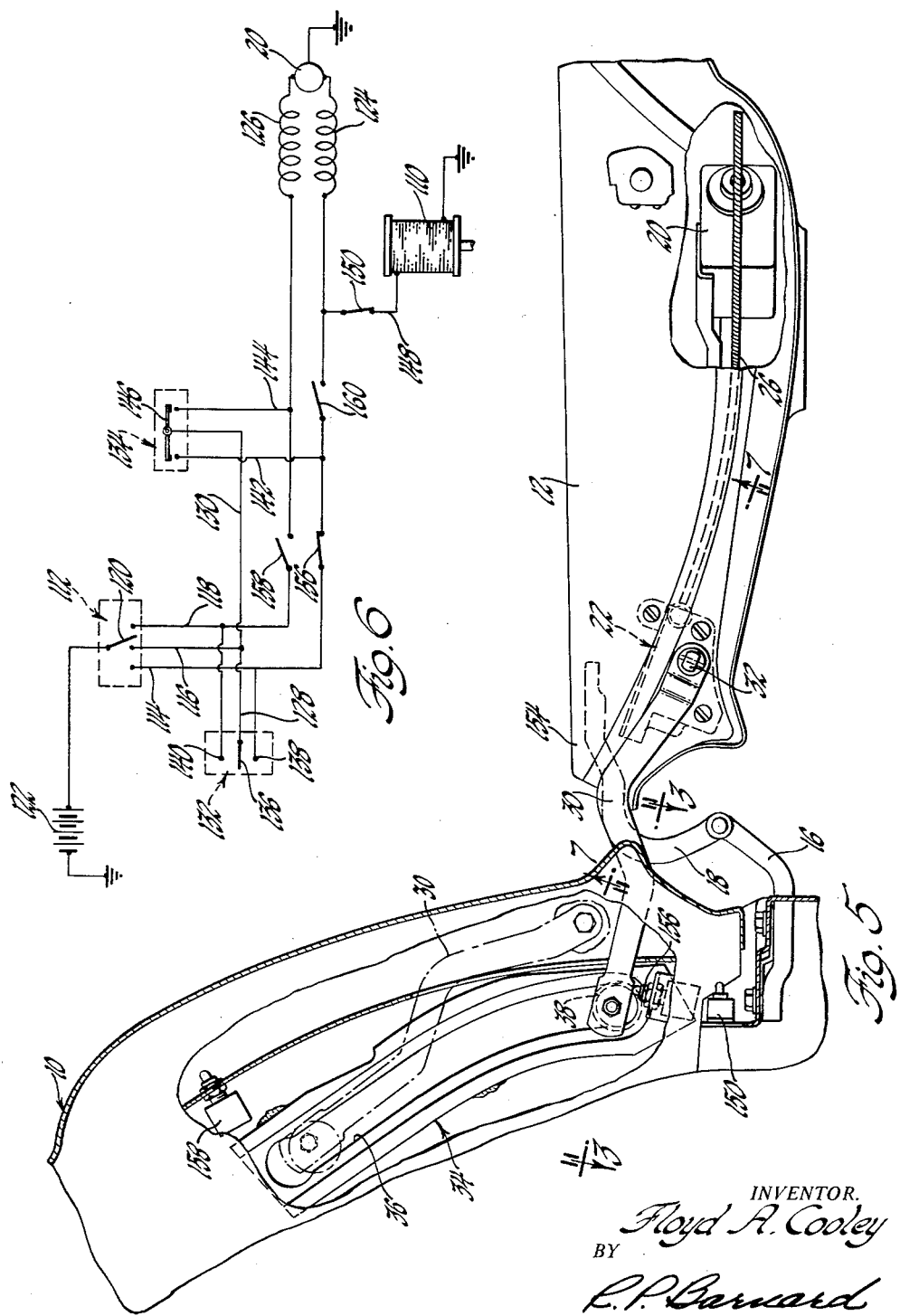

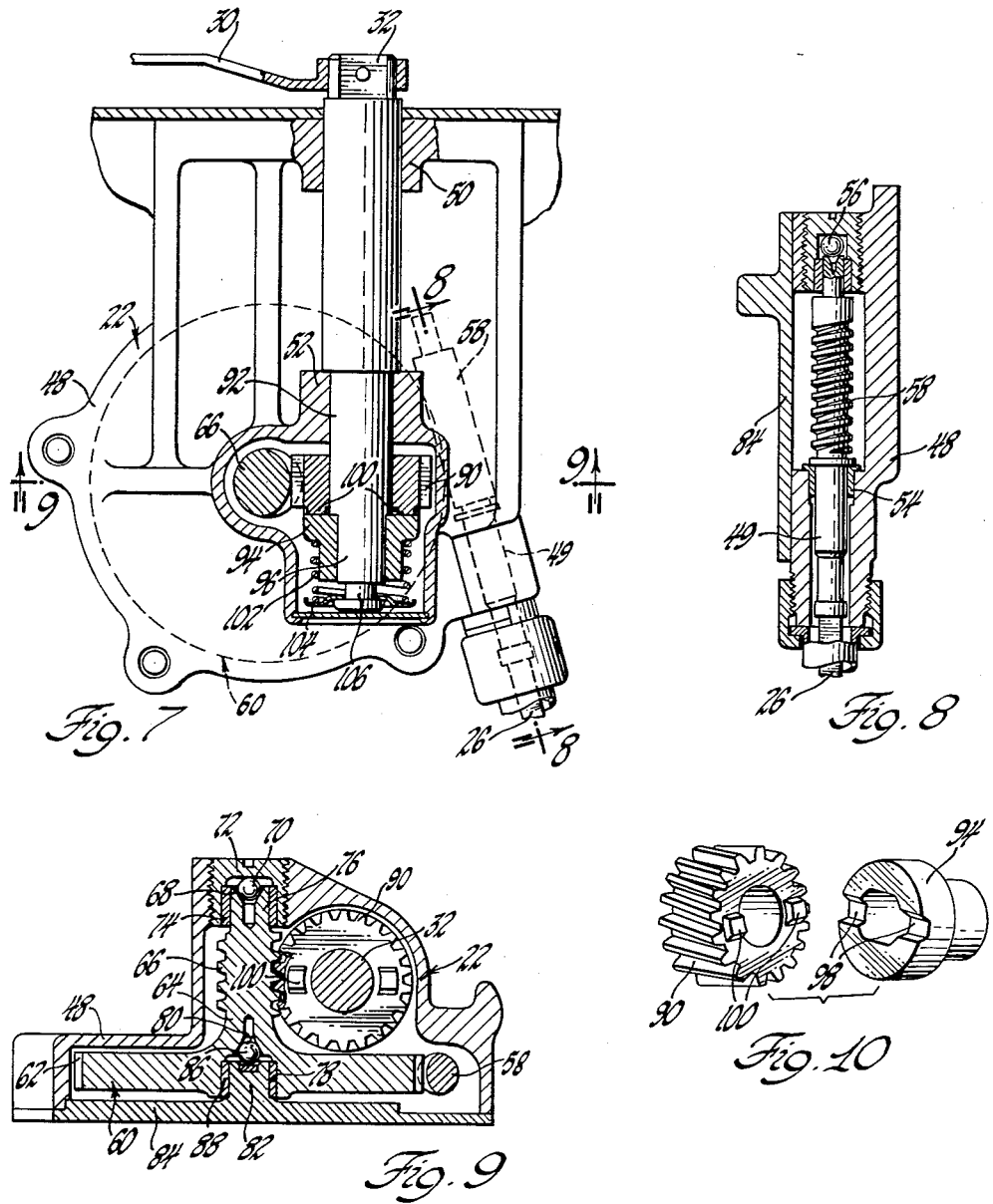

United States Patent Office 3,022,108
Patented Feb. 20, 1962

3,022,108
POWER-ACTUATED TAIL GATE
Floyd A. Cooley, Birmingham, Mich., assignor to General Motors Corporation, Detroit, Mich., a corporation of Delaware
Filed June 17, 1960, Ser. No. 36,907
11 Claims. (Cl. 296—57)

The present invention relates to a power-actuated closure member and more particularly to a power-actuated tail gate mechanism for a station wagon type vehicle.

Station wagons include a large tail gate member usually having a roll down window and which member is adapted to be opened to permit ready access to the rear end of the vehicle. Heretofore, tail gate actuation has necessitated the driver leaving the vehicle or the assistance of another person.

In the present invention a relatively simple power mechanism is provided which permits automatic actuation of the tail gate from a plurality of stations including the driver's seat. The difficulty in achieving a feasible power-actuated tail gate mechanism has been the relatively small amount of space available in the vehicle to house a sufficiently powerful actuating mechanism.

In the present invention, several unique features have been developed whereby a commercially practical system has been achieved. In the present instance, the entire tail gate power mechanism is located within the tail gate overcoming the problem of finding space within the vehicle body. Further, an extremely simple lever mechanism is provided whereby a pair of cam plate members are disposed at either side of the tail gate opening permitting a pair of levers to uniquely coact therewith to raise and lower the tail gate.

Other objects and advantages of the present invention will be apparent from a perusal of the detailed description which follows.

In the drawings:

FIGURE 5 is a side view of the rear end of the vehicle with the tail gate in an open position;

FIGURE 6 is a diagrammatic representation of the electrical control system for controlling the subject invention;

FIGURE 7 is a view along line 7—7 of FIGURE 5;

FIGURE 8 is a view along line 8—8 of FIGURE 7;

FIGURE 9 is a view along line 9—9 of FIGURE 7; and

FIGURE 10 is an exploded view of the clutch release mechanism of the tail gate lever actuating gear box.

Figure 1:
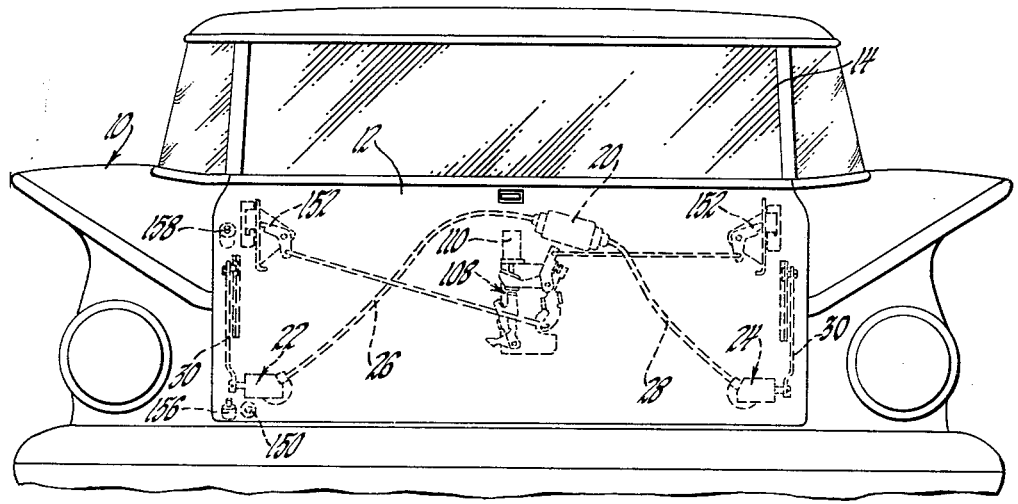
FIGURE 1 is a view of the rear end of a station wagon showing the subject tail gate operating mechanism.

Referring to FIGURES 1 and 5, a vehicle is indicated generally at 10 and includes a tail gate member 12 adapted to provide access to the rear end of the vehicle. Tail gate 12 includes a window 14 adapted to be rolled down and stored in the tail gate. Window 14 may be controlled electrically or manually as preferred. The means for controlling window 14 constitutes no part of the present invention and therefore the window operating mechanism has been eliminated in order to simplify the disclosure.

As best seen in FIGURE 5, tail gate 12 is pivotally mounted to the vehicle body through a pair of hinge members which include a strap 16 fixed to the vehicle body and a gooseneck strap 18 fixed to the tail gate.

The tail gate operating mechanism is indicated in dotted lines in FIGURE 1 and includes a motor 20, a pair of gear reduction devices 20 and 24 disposed adjacent the sides of the tail gate. Devices 22 and 24 are driven by flexible drive shafts 26 and 28 connected to motor 20. Inasmuch as the operating devices disposed on both sides of the tail gate are identical, it will only be necessary to describe one set thereof.

Figure 2:
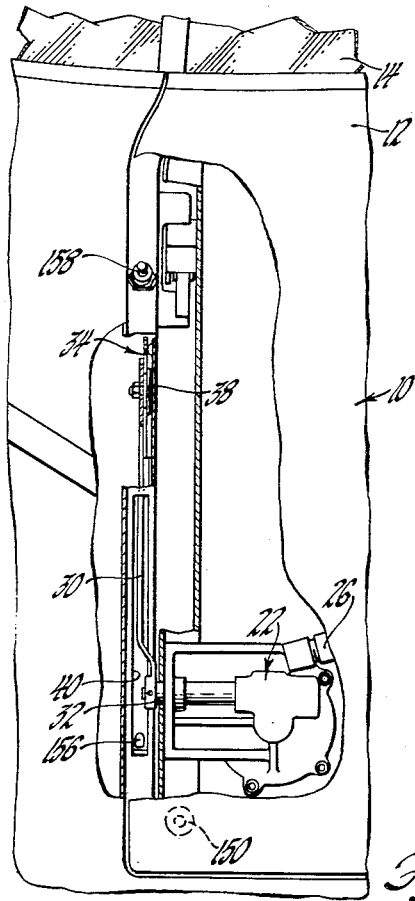
FIGURE 2 is an enlarged fragmentary view of one side of the tail gate operating mechanism showing the lever mechanism.
Figure 3:
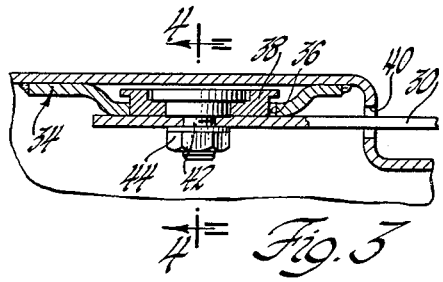
FIGURES 3 and 4 are enlargements of the lever supported cam follower member in relation to the body mounted cam plate.
Figure 4:
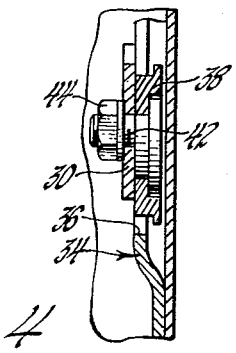

One end of tail gate operating lever 30 is fixed to output shaft 32 of gear box 22. A cam plate 34 is suitably mounted within the vehicle body adjacent the tail gate opening and includes a cam slot 36 adapted to receive a roller member 38 rotatably mounted on the free end of lever 30. Cam plate 34 is enclosed within the vehicle body which, as seen in FIGURE 2, is slotted at 40 to receive lever 30.

To permit limited adjustment of the length of lever 30, roller 38 is eccentrically mounted on a stud shaft 42 whereby loosening of nut 44 will permit the roller to be eccentrically rotated and thereby change the effective length of lever 30. This adjustment is found desirable to compensate for manufacturing variations and in this way assure proper tail gate operation.

The actual raising and lowering of the tail gate 12 is achieved by energizing motor 20 which in turn drives gear devices 22 and 24 through shafts 26 and 28 to impart a rotative movement to levers 30. Considering the tail gate in the position shown in FIGURE 5, motor 20 is energized to impart a clockwise rotation to lever 30. This rotation causes roller 38 to move upwardly within the arcuate cam slot 36 and in so doing to lift and move the tail gate in a counterclockwise or closing direction.

It will be appreciated that with the tail gate in the open position of FIGURE 5, that a relatively high torque output is required from gear box 22 to achieve the initial closing movement of the tail gate. The use of an inordinately large motor and gear box is avoided in the present device by designing the mechanism such that when tail gate 12 is in its fully open position, lever 30 is in a position to exert only a slight torque on gear box output shaft 32. This "no-torque" condition is achieved by the fact that any tendency of tail gate 12 to rotate about shaft 32 is resisted by hinge 16—18 acting in conjunction with operating lever 30. This "no-torque" condition is important in being able to utilize a relatively small motor since in beginning the closing of tail gate 12, motor 20 and gear box 22 may pick up momentum in driving lever 30 before the tail gate load is imposed thereon.

The torque load in moving tail gate 12 from its open to closed position increases until the tail gate has reached approximately 20° from the horizontal after which the torque load falls off rather rapidly. Inasmuch as the maximum torque load is imposed on motor 20 for a relatively short period, it is also apparent that a smaller motor can be utilized than would be the case if a high torque had to be sustained for a longer period.

The present tail gate actuating mechanism is such that the lifting of tail gate 12 is accomplished with or without the assistance of torque rods which are used on current type tail gate mechanisms to assist in the manual closing of these relatively heavy tail gates.

Motor 20 has a stall torque of approximately 11 pound-inches and drives devices 22 and 24 each of which provides an approximate 640:1 gear reduction.

Gear reduction devices 22 and 24 represent a unique design which is the subject of copending application Serial No. 41,580, filed July 8, 1960, now abandoned. Devices 22 and 24 had to be especially created due to the severe space limitations involved in mounting such a mechanism within a tail gate. Heretofore, no gear reduction mechanism has been available which would fulfill the severe space requirements and at the same time have the requisite operating characteristics. In addition to the unique construction and arrangement of component parts, the gear reduction devices have been designed so as to provide a clutch mechanism whereby in an emergency the tail gate may be manually moved to an opened or closed position.

Referring to FIGURES 7 through 10 gear device 22 includes a first casing member 48 including bearing portions 50 and 52 to rotatably support output shaft 32. As seen in FIGURE 7, tail gate operating lever 30 is suitably fixed to shaft 32. Casing 48 also rotatably supports power input shaft 49. Shaft 49 is driven from motor 20 through flexible shaft 26. Input shaft 49 is supported within casing 48 upon a bearing sleeve 54 and at the outermost end upon a ball member 56 the latter which is provided to reduce friction as much as possible. Input shaft 49 includes a worm section 58 which coacts with a gear member 60. Gear member 60 is actually a compound type gear having a relatively large diameter helical gear portion 62 formed thereon. Hub portion 64 extends axially to permit a worm gear section 66 to be formed thereon. The axially extended end of hub 64 is conically recessed at 68 to receive a ball bearing member 70 retained by a cap member 72 threadably mounted in casing 48. A journal 74 is pressed within a recessed portion of cap member 72 and rotatably supports the reduced end 76 of hub 64. The other end of gear hub 64 includes a large recess 78 and a conical recess 80 which respectively receive a gear supporting stub boss 82 formed on cover plate 84 and a ball member 86. A journal member 88 is pressed on boss 82. Ball bearing members 70 and 86 are again used to reduce friction and increase the efficiency of the gear device.

As best seen in FIGURES 7 and 9, the axis of gear member 60 is normal to and offset from the axis of output shaft 32. At the same time, the axis of input shaft 49 is normal to the axis of gear 60, laterally offset from and inclined to the axis of output shaft 32.

Worm gear 66 of compound gear 60 is adapted to mesh with and drive a gear member 90 rotatably supported upon reduced section 92 of output shaft 32. A collar 94 is suitably keyed to a further reduced portion 96 of output shaft 32 to rotate therewith but permitting relative longitudinal movement. Collar 94 includes a pair of diametrically spaced tapered recesses 98 which in turn are adapted to receive axially extending correspondingly tapered projections 100 formed on gear member 90. Collar 94 is peripherally reduced to provide a seat for one end of a spring member 102, the other end of which is retained by a washer seat 104 supported upon a stud portion 106 of shaft 32. Spring 102 urges collar 94 toward gear member 90 whereby recesses 98 and projections 100 are normally in mating engagement whereby a driving relationship is established between gear 60, gear 90, collar 94 and output shaft 32. The purpose of this arrangement is to provide a clutch mechanism whereby in an emergency the tail gate may be opened or closed manually. This is achieved by pulling on the tail gate wth sufficient force to cam collar 94 axially away from gear member 90 and thereby temporarily interrupting the drive connection between output shaft 32 and the remainder of the gear device.

Power is transmitted through gear device 22 to tail gate operating lever 30 as follows: input shaft worm 58 drives compound gear 60 which through worm 66 drives gear 90. Gear 90 through clutch mechanism 100—98—94 drives output shaft 32 and thereby lever 30.

The development of the compact gear reduction device 22 has been an extremely important contributing factor to the realization of a commercially satisfactory tail gate actuating mechanism.

Referring again to FIGURE 1, a conventional latching mechanism is provided at 108 for locking the tail gate in a closed position. Latch mechanism 108 is essentially the same as that shown in copending application Serial No. 751,939, Bogater et al., filed July 30, 1958, Patent No. 2,959,448, issued November 8, 1960. The copending application structure has been modified only to the extent necessary to provide a solenoid 110 for electrically operating the latch mechanism rather than using the manual operating mechanism as shown in said application. Modifying latch mechanism 108 by the addition of a solenoid enables the tail gate to be automatically and remotely controlled simply through the actuation of appropriate switches as will now be considered in greater detail.

The electrical system for controlling the subject tail gate operating mechanism is shown diagrammatically in FIGURE 6. A dash mounted switch mechanism 112 is provided and includes three terminals to which leads 114, 116 and 118 are respectively connected. A movable contact 120 receives current from a suitable source such as battery 122. Leads 114 and 118 respectively connect with windings 124 and 126 of motor 20 to provide the tail gate opening and closing rotation of the motor depending on which winding is energized.

Dash switch lead 116 provides the power input through leads 128 and 130 to a pair of switch mechanisms 132 and 134. Switch 132 is adapted to be mounted within the vehicle compartment remote from the driver position such as on the side panel adjacent the tail gate. Switch 132 is of the double throw type and includes a movable contact 136 whereby a rear passenger may selectively energize the opening or closing circuits by engaging terminals 138 or 140.

Double throw switch 134 is adapted to be mounted on the tail gate to provide external actuation thereof. This switch likewise includes leads 142 and 144 connecting to the opening and closing circuits of motor 20. Switch 134 is of the thermal type as shown and described in detail in copending application of Albert J. Colautti, filed February 2, 1960, Serial No. 8,267. Basically, the movable contact 146 of switch 134 may be moved to engage either the opening or closing terminal and is normally retained in this position until the tail gate is either opened or closed at which time a bimetal will be heated releasing the movable contact and returning the same to a neutral position. The movable contact 146 may also be manually returned to a neutral position if desired.

Latch solenoid 110 is connected to the tail gate opening lead 114 through a lead 148 which includes a limit switch 150. Switch 150 is normally closed, as shown, whereby upon energization of lead 114 to open the tail gate, solenoid 110 will also be energized to open the tail gate latches 152. As best seen in FIGURE 5, solenoid limit switch 150 is disposed adjacent the bottom edge of the tail gate opening and is adapted to be engaged by inner tail gate wall 154 when the tail gate is closed to maintain the switch in the closed position as shown in FIGURE 6. However, after the tail gate opens sufficiently to clear the latches, wall 154 will move away from switch 150 permitting the same to be opened whereby solenoid 110 will be de-energized. Likewise, as the tail gate is again moved to its closed position switch 150 will be closed conditioning the solenoid for actuation in anticipation of reopening the tail gate.

Limit switches 156 and 158 are respectively provided in opening and closing circuits 114 and 118 to shut off the current to motor 20 when the tail gate has reached either its fully opened or fully closed position. Thus, with the tail gate closed limit switch 156 will be closed to permit energization of the opening circuit 114. When the tail gate reaches its fully opened position, as shown in FIGURE 5, tail gate operating lever 30 will engage switch 156 to open the same and cut off the power to the motor. With the energization of closing circuit 118, motor 20 will move the tail gate to its closed position in which tail gate wall 154 engages limit switch 158 cutting off the current to the motor.

One further limit switch 160 is provided in opening circuit 114 and is normally biased in an open position.

Limit switch 160 is adapted to be closed when tail gate window 14 is fully retracted within the tail gate preventing actuation of the latter when the window is in an extended position.

I claim:

1. A vehicle tail gate closure mechanism of the type in which the tail gate is pivotally mounted along its lower edge to the rear opening of the vehicle permitting the tail gate to be rotated about a horizontal axis providing rear access to the vehicle compartment and including a motor mounted within said tail gate, a pair of reduction gear devices disposed within said tail gate, said motor being operatively connected to said devices to drive the same, each reduction gear device including an output shaft having an end projecting from said tail gate, a lever fixed at one end to the output shaft of said reduction gear device, a cam plate member mounted within the vehicle body proximate the tail gate opening, a follower member disposed on the other end of said lever and coacting with said cam plate, actuation of said motor being adapted to drive the reduction gear devices and rotate said levers whereby the follower members will be caused to traverse the cam plate to effect opening and closing movement of the tail gate.

2. A vehicle tail gate closure mechanism of the type in which hinge means are provided for pivotally mounting the tail gate along its lower edge to the rear opening of the vehicle permitting the tail gate to be rotated about a horizontal axis providing rear access to the vehicle compartment and including a motor mounted within said tail gate, a pair of reduction gear devices disposed within said tail gate proximate the sides thereof, said motor being operatively connected to said devices to drive the same, each reduction gear device including an output shaft having an end projecting from said tail gate, a lever fixed at one end to the output shaft of said reduction gear device, a plate member having a cam slot therein mounted within the vehicle body proximate the tail gate opening, and a follower member disposed on the other end of said lever and coacting with said cam slot, actuation of said motor being adapted to drive the reduction gear devices and rotate said levers whereby the follower members will be caused to traverse the cam slot to effect opening and closing movement of the tail gate, the hinge means lever and cam slot being arranged so that a light torque load is imposed on the reduction gear output shaft when the tail gate is in the fully open position.

3. A vehicle tail gate closure mechanism of the type in which the tail gate is pivotally mounted along its lower edge to the rear opening of the vehicle permitting the tail gate to be rotated about a horizontal axis providing rear access to the vehicle compartment and including a motor mounted within said tail gate, a pair of reduction gear devices disposed within said tail gate, said motor being operatively connected to said devices to drive the same, each reduction gear device including an output shaft having an end projecting from said tail gate, a lever fixed at one end to the output shaft of said reduction gear device, a cam plate member mounted within the vehicle body proximate the tail gate opening, a follower member disposed on the other end of said lever and coacting with said cam plate, actuation of said motor being adapted to drive the reduction gear devices and rotate said levers whereby the follower members will be caused to traverse the cam plate to effect opening and closing movement of the tail gate, and means for interrupting the driving connection between the reduction gear device and the tail gate to permit emergency manual operation of the tail gate.

4. A vehicle tail gate closure mechanism as set forth in claim 1 in which the follower member is eccentrically mounted on the tail gate lever whereby adjustment of the follower will permit varying the effective length of the lever.

5. A vehicle tail gate closure mechanism as set forth in claim 3 in which the drive interrupting means comprises a clutch mechanism incorporated in the reduction gear device.

6. A vehicle tail gate closure mechanism as set forth in claim 1 in which the cam plate is enclosed within the vehicle body, said body including a slotted opening permitting the follower end of the lever to project therethrough to coact with the cam plate.

7. A vehicle tail gate operating mechanism of the type in which the tail gate is pivotally mounted proximate its lower edge to the lower portion of a rear opening in the vehicle permitting the tail gate to be rotated about a horizontal axis permitting access to the vehicle compartment and including a solenoid controlled latch mechanism for locking the tail gate in a closed position, a motor disposed within said tail gate, a pair of gear reduction devices disposed in said tail gate and operatively connected to said motor, each device having a power output shaft extending from the tail gate, a lever fixed to the output shaft of said gear reduction device, a cam plate member fixed to the vehicle body proximate the tail gate opening and including a cam slot, said lever including a follower member adapted to coact with said cam slot, and means for energizing said motor and said solenoid actuated latch whereby the latch mechanism will unlock the tail gate when said motor is energized to lower the tail gate, energization of said motor causing the reduction gear devices to rotate the levers and thereby moving the follower members in said slots to effect opening and closing movement of said tail gate.

8. A vehicle tail gate operating mechanism of the type in which the tail gate is pivotally mounted proximate its lower edge to the lower portion of a rear opening in the vehicle permitting the tail gate to be rotated about a horizontal axis permitting access to the vehicle compartment and including a solenoid controlled latch mechanism for locking the tail gate in a closed position, a motor disposed within said tail gate, a pair of gear reduction devices disposed in said tail gate and operatively connected to said motor, each device being disposed proximate a side edge of the tail gate and having a power output shaft extending from the tail gate, a lever fixed to the output shaft of said gear reduction device, a cam plate member fixed to the vehicle body proximate the tail gate opening and including a cam slot, said lever including a follower member adapted to coact with said cam slot, means for energizing said motor and said solenoid actuated latch whereby the latch mechanism will unlock the tail gate when said motor is energized to lower the tail gate, energization of said motor causing the follower members in said slots to effect opening and closing movement of said tail gate, and a switch adapted de-energize said solenoid after the tail gate has opened to a limited extent.

9. A vehicle tail gate operating mechanism of the type in which the tail gate is pivotally mounted proximate its lower edge to the lower portion of a rear opening in the vehicle permitting the tail gate to be rotated about a horizontal axis permitting access to the vehicle compartment and including a window retractably mounted in the tail gate, a solenoid controlled latch mechanism for locking the tail gate in a closed position, a motor disposed within said tail gate, a pair of gear reduction devices disposed in said tail gate and operatively connected to said motor, each device having a power output shaft extending from the tail gate, a lever fixed to the output shaft of said gear reduction device, a cam plate member fixed to the vehicle body proximate the tail gate opening and including a cam slot, said lever including a follower member adapted to coact with said cam slot, and means for energizing said motor and said solenoid actuated latch whereby the latch mechanism will unlock the tail gate when said motor is energized to lower the tail gate, energization of said motor causing the reduction gear devices to rotate the lever and thereby moving the follower members in said slots to effect opening and closing movement of said tail gate, and a switch preventing energization of the motor until the window is fully retracted within the tail gate.

10. A vehicle tail gate operating mechanism as set forth in claim 7 in which the motor energizing means comprises a plurality of double throw switches permitting tail gate actuation from a plurality of stations on the vehicle.

11. A vehicle tail gate operating mechanism as set forth in claim 10 in which the motor energizing means includes additional switch means to automatically de-energize the motor when the tail gate is moved to both its fully closed and open positions.

References Cited in the file of this patent

UNITED STATES PATENTS

| | | |
|---|---|---|
| 2,811,348 | Brundage | Oct. 29, 1957 |
| 2,845,299 | Pickering | July 29, 1958 |
| 2,893,727 | Barnard | July 7, 1959 |

UNITED STATES PATENT OFFICE
CERTIFICATE OF CORRECTION

Patent No. 3,022,108                              February 20, 1962

Floyd A. Cooley

It is hereby certified that error appears in the above numbered patent requiring correction and that the said Letters Patent should read as corrected below.

Column 6, line 50, after "causing" insert -- the reduction gear devices to rotate said levers and thereby moving --; line 52, after "adapted" insert -- to --.

Signed and sealed this 26th day of June 1962.

(SEAL)
Attest:

ERNEST W. SWIDER
Attesting Officer

DAVID L. LADD
Commissioner of Patents